(12) United States Patent
Wang et al.

(10) Patent No.: US 7,773,950 B2
(45) Date of Patent: Aug. 10, 2010

(54) BENIGN INTERFERENCE SUPPRESSION FOR RECEIVED SIGNAL QUALITY ESTIMATION

(75) Inventors: Yi-Pin Eric Wang, Cary, NC (US); Gregory E. Bottomley, Cary, NC (US); Rajaram Ramesh, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1595 days.

(21) Appl. No.: 10/869,527

(22) Filed: Jun. 16, 2004

(65) Prior Publication Data

US 2005/0282500 A1    Dec. 22, 2005

(51) Int. Cl.
*H04B 17/00*    (2006.01)

(52) U.S. Cl. .............. 455/67.13; 455/67.11; 455/226.2; 455/226.3

(58) Field of Classification Search ................. 455/63.1, 455/67.11, 67.13, 226.2, 226.3, 296, 302
See application file for complete search history.

(56) References Cited

U.S. PATENT DOCUMENTS

| | | | |
|---|---|---|---|
| 5,875,215 A | 2/1999 | Dobrica | |
| 5,903,554 A | 5/1999 | Saints | |
| 6,002,715 A | 12/1999 | Brailean et al. | |
| 6,028,894 A | 2/2000 | Oishi et al. | |
| 6,034,952 A | 3/2000 | Dohi et al. | |
| 6,108,374 A | 8/2000 | Balachandran et al. | |
| 6,131,013 A * | 10/2000 | Bergstrom et al. | 455/63.1 |
| 6,137,788 A | 10/2000 | Sawahashi et al. | |
| 6,144,861 A | 11/2000 | Sundelin et al. | |
| 6,157,820 A | 12/2000 | Sourour et al. | |
| 6,259,752 B1 | 7/2001 | Domino et al. | |

(Continued)

FOREIGN PATENT DOCUMENTS

EP    0915629 A2    5/1999

(Continued)

OTHER PUBLICATIONS

Bottomley, G.E., Ottosson, T., and Wang, Y.-P. E, "A generalized RAKE receiver for interference suppression," IEEE J. Sel. Areas in Commun., vol. 18, Aug. 2000, pp. 1536-1545.

(Continued)

*Primary Examiner*—Tuan H Nguyen
(74) *Attorney, Agent, or Firm*—Coats & Bennett, P.L.L.C.

(57) ABSTRACT

A receiver circuit suppresses effects of "benign" impairment from the calculation of received signal quality estimates, such that the estimate depends primarily on the effects of non-benign impairment. For example, a received signal may be subject to same-cell and other-cell interference plus noise, which is generally modeled using a Gaussian distribution, and also may be due to certain forms of self-interference, such as quadrature phase interference arising from imperfect derotation of the pilot samples used to generate channel estimates for the received signal. Such interference generally takes on a distribution defined by the pilot signal modulation, e.g., a binomial distribution for binary phase shift keying modulation. Interference arising from such sources is relatively "benign" as compared to Gaussian interference and thus should be suppressed or otherwise discounted in signal quality calculations. Suppression may be based on subtracting benign impairment correlation estimates from total impairment correlation estimates, or on filtering the benign impairment in channel estimation.

36 Claims, 4 Drawing Sheets

U.S. PATENT DOCUMENTS

| | | | |
|---|---|---|---|
| 6,292,519 B1 | 9/2001 | Popovic | |
| 6,385,183 B1 | 5/2002 | Takeo | |
| 6,426,971 B1 | 7/2002 | Wu et al. | |
| 6,687,235 B1* | 2/2004 | Chu | 370/286 |
| 6,947,403 B2* | 9/2005 | Heikkila et al. | 370/335 |
| 7,016,436 B1* | 3/2006 | Molnar | 375/346 |
| 7,027,503 B2* | 4/2006 | Smee et al. | 375/233 |
| 7,088,978 B2* | 8/2006 | Hui et al. | 455/296 |
| 7,167,716 B2* | 1/2007 | Kim | 455/502 |
| 2001/0036812 A1 | 11/2001 | Engstrom | |
| 2002/0034216 A1 | 3/2002 | Yanagi | |
| 2002/0115468 A1 | 8/2002 | Haim | |
| 2002/0141486 A1 | 10/2002 | Bottomley et al. | |
| 2002/0159514 A1 | 10/2002 | Miyoshi et al. | |
| 2002/0186761 A1 | 12/2002 | Corbaton et al. | |
| 2002/0196879 A1 | 12/2002 | Iochi | |
| 2003/0016740 A1 | 1/2003 | Jeske et al. | |
| 2003/0031135 A1 | 2/2003 | Itoh | |
| 2003/0031279 A1 | 2/2003 | Blount et al. | |
| 2003/0058821 A1 | 3/2003 | Lee et al. | |
| 2003/0096618 A1 | 5/2003 | Palenius | |
| 2003/0114179 A1 | 6/2003 | Smolyar et al. | |
| 2003/0223489 A1* | 12/2003 | Smee et al. | 375/233 |
| 2004/0028121 A1* | 2/2004 | Fitton | 375/144 |
| 2005/0003782 A1* | 1/2005 | Wintzell | 455/226.3 |
| 2005/0254600 A1* | 11/2005 | Chen et al. | 375/324 |

FOREIGN PATENT DOCUMENTS

| | | |
|---|---|---|
| EP | 1 111 815 | 6/2001 |
| EP | 1 341 335 | 9/2003 |
| JP | 59063847 | 4/1984 |
| WO | WO 01/01601 | 1/2001 |
| WO | 01/45289 | 6/2001 |
| WO | WO 01/56183 | 8/2001 |
| WO | WO 01/65717 | 9/2001 |
| WO | WO 03/049337 | 6/2003 |
| WO | WO 03/061184 | 7/2003 |
| WO | WO 03/063376 | 7/2003 |

OTHER PUBLICATIONS

Lee, C.-C. and Steele, R., "Closed-loop power control in CDMA systems," IEEE Proc.-Commun., vol. 143, Aug. 1996, pp. 231-239.

Usuda, M., Ishakawa, Y., and Onoe, S., "Optimizing the number of dedicated pilot symbols for forward link in W-CDMA systems," in Proc. IEEE Veh. Technol. Conf., Tokyo, Japan, May 15-18, 2000, pp. 2118-2122.

Dohi, T., Okumura, Y., and Adachi, F., "Further results on field experiments of coherent wideband DS-CDMA mobile radio," IEICE Trans. Commun., vol. E81-B, No. 6, Jun. 1998, pp. 1239-1247.

Higuchi, K., Andoh, H., Sawahashi, M., and Adachi, F., "Experimental evaluation of combined effect of coherent Rake combining and SIR-based fast transmit power control for reverse link of DS-CDMA mobile radio," IEEE J. Sel. Areas Commun., vol. 18, Aug. 2000, pp. 1526-1535.

Wiesel, A., Goldberg, J., and Messer, H., "Data-aided signal-to-noise-ratio estimation in time selective fading channels," in Proc. IEEE Intl. Conf. on Acoustics, Speech, and Sig. Proc. (ICASSP), Orlando, May 13-17, 2002, pp. III-2197-III-2200.

Falahati, S., Svensson, A., Ekman, T., and Sternad, M., "Effect of channel prediction errors on adaptive modulation systems for wireless channels," in Proc. RadioVetenskap och Kommunikation 02 (RVK-02), Stockholm, Sweden, Jun. 10-13, 2002.

Boudreau, D., et al., "Wide-band CDMA for the UMTS/IMT-2000 satellite component," IEEE Trans. Veh. Technol., vol. 51, Mar. 2002, pp. 306-331.

Gunaratne, S., Taaghol, P., and Tafazolli, R., "Signal quality estimation algorithm," IEEE Electronics Letters. vol. 36, Oct. 26, 2000, pp. 1882-1884.

Wiesel, A., Goldberg, J., and Messer, H., "Non-data-aided signal-to-noise-ratio estimation," in Proc. IEEE Intl. Conf. Commun. (ICC), New York, NY, Apr. 28-May 2, 2002, pp. 197-201.

Wiesel, A., Goldberg, J., and Messer, H., "Signal-to-noise-ratio estimation in time selective fading channels," Thesis Presentation, Tel Aviv University, Mar. 2002.

Fahrner, A., Dieterich, H., and Frey, T., "SIR estimation for fast power control for FDD-UMTS," in Proc. IEEE Veh. Technol. Conf. (VTC), Vancouver, Canada, Sep. 24-28, 2002, pp. 1274-1278.

Yoon, Y.-S., and Lee, Y.-H, "Adaptive SIR estimation in WCDMA systems," in Proc. IEEE Veh. Technol. Conf. (VTC), Birmingham, Alabama, May 6-9, 2002, pp. 275-279.

Ekman, T., Sternad, M., and Ahlén, A., "Unbiased power prediction of Rayleigh fading channels," in Proc. IEEE Veh. Technol. Conf. (VTC), Vancouver, Canada, Sep. 24-28, 2002, pp. 280-284.

Hua, Z., "Traffic channel SIR estimation based on reverse pilot channel," in Proc. IEEE ICCT, Bejing, China, Apr. 9-11, 2003.

Pauluzzi, D., and Beaulieu, N., "A comparison of SNR estimation techniques for the AWGN channel," IEEE Trans. on Commun., vol. 48, No. 10, Oct. 2002, pp. 1681-1691.

Won, S.H., Kim, W.W., Ahn, J., and Lyn, D.-S., "An unbiased signal-to-interference ratio estimator for high speed downlink packet access system," ETRI Journal, vol. 25, No. 5, Oct. 2003.

Gunaratne, S., Jeans, T.G., Tafazolli, R., and Evans, B.G., "Comparison of SIR estimation techniques for closed-loop power control in the WCDMA system," in Proc. European Wireless 2002 Conf., Florence, Italy, Feb. 25-28, 2002.

Cheng, J.-F., Wang, Y.-P.E., and Parkvall, S., "Adaptive incremental redundancy," in Proc. IEEE VTC Conf., Fall 2003.

Seo, S., Dohi, T., and Adachi, F., "SIR-based transmit power control of reverse link for coherent DS-CDMA mobile radio," IEICE Trans. on Commun., vol. E-81, No. 7, Jul. 1998.

3GPP TS 25.101 V5.7.0. (Jun. 2003); $3^{rd}$ Generation Partnership Project; Technical Specification Group Radio Access Network; User Equipment (UE) radio transmission and reception (FDD) (Release 5); 96 pgs.

3GPP TS 25.214 V5.3.0 (Dec. 2002); $3^{rd}$ Generation Partnership Project; Technical Specification Group Radio Access Network; Physical layer procedures (FDD) Release 5; 63 pgs.

U.S. Appl. No. 10/869,456, filed Jun. 16, 2004; Bottomley, et al.; SIR Estimation in a Wireless Receiver; 47 pgs.

U.S. Appl. No. 60/580,202, filed Jun. 16, 2004; Wallén; Reduction of SIR Estimation Bias Under Frequency Error; 14 pgs.

* cited by examiner

BENIGN INTERFERENCE SUPPRESSION FOR RECEIVED SIGNAL QUALITY ESTIMATION

BACKGROUND OF THE INVENTION

The present invention generally relates to wireless communication networks, and particularly relates to estimating received signal quality in such networks.

The term "link adaptation" in the context of wireless communication networks generally connotes the dynamic modification of one or more transmit signal parameters responsive to changing network and radio conditions. For example, evolving wireless communication standards define shared packet data channels that serve a number of mobile stations, also referred to as "users," on a scheduled basis.

Wideband Code Division Multiple Access (WCDMA) standards define, for example, a High Speed Downlink Packet Access (HSDPA) mode wherein a High Speed Packet Data Shared Channel (HS-PDSCH) is used on a scheduled basis to transmit packet data to a potentially large number of users. The IS-856 standard defines a similar shared packet data channel service, known as High Data Rate (HDR), and cdma2000 standards, such as 1XEV-DO, define similar high-speed shared packet data channel services.

Generally, the shared packet data channels in all such services are rate controlled rather than power controlled, meaning that a channel signal is transmitted at full available power and the data rate of the channel is adjusted for that power based on the radio conditions reported for the mobile station being served at that particular instant in time. For a given transmit power, then, the data rate of the channel generally will be higher if the mobile station being served is in good radio conditions as opposed to a mobile station experiencing poor radio conditions. Of course, other parameters may bear on the data rate actually used, such as the type of service the mobile station is engaged in, etc.

Nonetheless, when serving a particular mobile station, the efficient utilization of the shared channel depends in large measure on the accuracy of the channel quality reported for that mobile station, since that variable represents a primary input into the data rate selection process. Simply put, if the mobile station has over-reported its channel quality, it is apt to be served at a too high a rate, leading to a high block error rate. Conversely, if the mobile station under-reports its channel quality it will be underserved. That is, it will be served at a data rate that is less than its actual channel conditions could support.

The under-reporting of channel quality may particularly arise when the apparent impairment (interference plus noise) at the receiver comprises both harmful and "benign" interference. As the term is used herein, "benign" interference is interference that affects the calculation of apparent signal quality but, in reality, does not overly degrade data signal demodulation. Thus, benign interference of a given power results in a much lower data error rate than would harmful interference of the same power. That means, if the signal quality target is, say, a 10% frame or block error rate, the receiver could achieve that target in the presence of a greater level of benign interference than could be tolerated if the interference were non-benign.

By way of non-limiting example, the total received signal impairment at a given communication receiver may comprise a Gaussian impairment component arising from same-cell interference, other-cell interference, thermal noise, etc., and a non-Gaussian impairment component arising from, for example, so called self-interference that occurs because of imperfect de-rotation of the received symbols. Other contributors to self-interference include local oscillator frequency errors, and rapid channel fading conditions. Such interference may take on a probability distribution defined by the modulation format, e.g., a binomial distribution associated with a Binary Phase Shift Keying (BPSK) modulation format.

Because the probability distribution of the non-Gaussian impairment does not include the characteristic "tails" of a Gaussian distribution, its effect on signal demodulation typically is not as severe as a Gaussian impairment. Indeed, the effect of even substantial amounts of non-Gaussian impairment may be relatively minor. Therefore, the conventional approach to estimation of received signal quality at a wireless communication receiver, which is based on the apparent, total signal impairment, i.e., the total impairment including Gaussian and non-Gaussian impairment components, may not provide a true picture of the receiver's current reception capabilities and, in fact, may cause the receiver to under-report its received signal quality by a significant amount.

SUMMARY OF THE INVENTION

The present invention comprises a method and apparatus to improve signal quality estimation based on suppressing or otherwise discounting the effects of "benign" interference from the calculation of a signal quality estimate for a received signal. In this context, interference is benign if it does not significantly impair signal demodulation. As an example, the total impairment affecting the calculation of a signal quality estimate may comprise non-benign interference, which must be accounted for in the quality estimation, and relatively benign interference, such as binomially distributed interference. By suppressing the effect of benign interference from the quality estimation calculation, the result yields a truer "picture" of received signal quality with respect to actual signal demodulation.

Thus, an exemplary method of estimating signal quality for a received signal in accordance with one or more embodiments of the present invention comprises calculating an impairment correlation estimate for non-benign impairment of the received signal based on suppressing the effects of benign impairment. A signal-to-interference ratio (SIR) estimate may then be generated based on that impairment correlation estimate, and the SIR may then be used for reporting a signal quality to a wireless communication network, which may use the report for signal rate adaptation. By way of non-limiting example, Gaussian impairment generally is non-benign in that it strongly degrades a receiver's demodulation performance, and non-Gaussian impairment generally is benign in that it weakly degrades the receiver's demodulation performance.

Thus, such suppression may be, for example, based on calculating a total impairment correlation estimate based on despread values of a reference channel signal that comprises the received signal, or is received in association with it, calculating a benign, non-Gaussian impairment correlation estimate, and subtracting the non-Gaussian impairment correlation estimate from the total impairment correlation estimate to obtain a non-benign Gaussian impairment correlation estimate. Alternatively, such suppression may be based on suppressing benign impairment effects in a channel estimation process to thereby obtain modified channel estimates, and calculating the non-benign impairment correlation estimate from the modified channel estimates. Suppressing benign impairment from a channel estimation process may comprise applying an interpolation filter to despread values of the reference channel signal.

In another embodiment, the method of estimating signal quality comprises calculating a SIR estimate for a received signal subject to a total impairment comprising relatively harmful impairment with respect to signal demodulation, and relatively harmless impairment, and suppressing the relatively harmless impairment from the calculation of a SIR estimate so that a SIR estimate is greater than would be calculated based on the total impairment. Again, such suppression may be based on subtracting an estimate of harmless impairment from an estimate of the total impairment, or based on obtaining modified channel estimates by filtering the effects of the harmless impairment from channel estimates used to calculate the SIR.

Thus, an exemplary receiver circuit for estimating received signal quality comprises a signal quality calculation circuit configured to calculate a SIR estimate for a received signal subject to a total impairment comprising both benign impairment and non-benign impairment, and an impairment suppression circuit configured to suppress the benign impairment from the calculation of a SIR estimate so that the SIR estimate is greater than would be calculated based on the total impairment. The exemplary receiver circuit may be implemented in hardware, software, or any combination thereof. Further, it may comprise a portion of a baseband processor, which may be implemented as a microprocessor circuit, a digital signal processor (DSP) circuit, or as some other digital logic circuit.

In an exemplary implementation, the receiver circuit is included in a mobile terminal for use in a wireless communication network, such as a WCDMA or cdma2000 network. So configured, an exemplary terminal comprises a transmitter to transmit signals to the network, and a receiver to receive signals from the network. The receiver includes a receiver circuit that comprise a signal quality calculation circuit configured to calculate a SIR estimate for a received signal subject to a total impairment comprising both benign impairment and non-benign impairment, an impairment suppression circuit configured to suppress the benign impairment from the calculation of a SIR estimate so that a SIR estimate is greater than would be calculated based on the total impairment.

The above features and advantages are described in more detail in the following discussion. Those skilled in the art will recognize additional features and advantages upon reading that discussion, and upon viewing the accompany figures in which like elements are assigned like reference numbers.

DETAILED DESCRIPTION OF THE INVENTION

Figure 2:
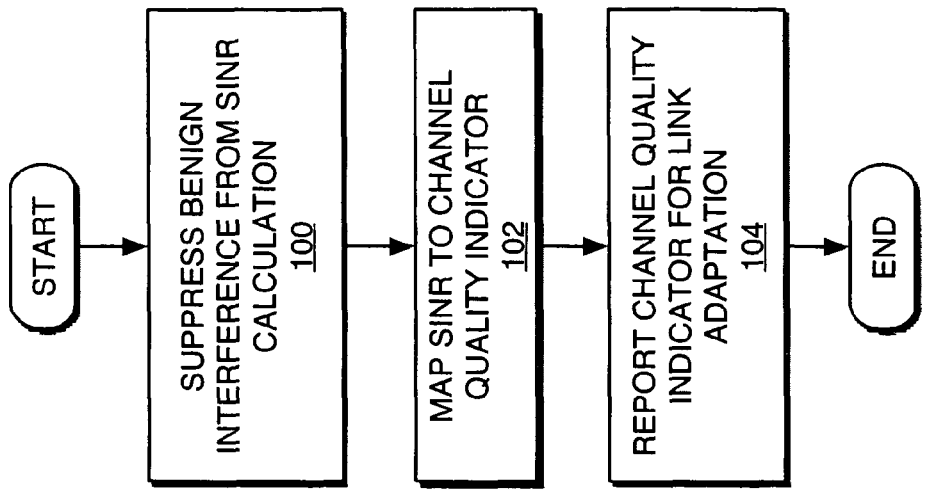
FIG. 2 is a diagram of exemplary benign interference suppression for improved received signal quality estimation according to the present invention.

Although exemplary embodiments of the present invention are described in the context of CDMA-based wireless communication networks, such as WCDMA and cdma2000, it should be understood that the present invention applies to a wide variety of communication systems and receiver types. In broad terms, the present invention recognizes that overall interference measurements at a wireless receiver may include different types of interference, and that some types of interference are less "harmful" to signal demodulation than others. By basing received signal quality estimates on interference estimates wherein the contribution of the less harmful interference is suppressed from the calculation, a receiver according to the present invention provides a signal quality estimate that represents a truer picture of its reception conditions. That truer picture may be used to control the radio link more efficiently.

For example, according to the High Speed Downlink Packet Access (HSDPA) mode in WCDMA, the selection of an operating information transmission rate is determined by the radio channel condition. When the channel condition is good, a coding and modulation scheme corresponding to a higher data rate is used. Conversely, during bad channel conditions, transmission data rate is reduced in favor of using more robust coding and modulation schemes. Such data rate adaptation often is referred to as "link adaptation."

In the WCDMA context, a mobile station provides channel quality indicators (CQIs) to a supporting WCDMA network that uses the reported CQI values to set the forward link data rate for the mobile station, i.e., the better the reported channel quality, the higher the link rate, and vice versa. Such operations also may be performed in other network types. Continuing with the WCDMA example, CQI can be estimated by estimating the symbol signal-to-interference-plus-noise ratio (SINR) on the forward Common Pilot Channel (CPICH) as received at the mobile station, translating the CPICH symbol SINR to a SINR value for symbols received on the High Speed Packet Data Shared Channel (HS-PDSCH) based on a reference power offset between CPICH and HS-PDSCH and, possibly, spreading factor differences, and, finally, determining the CQI estimate from the HS-PDSCH symbol SINR. Note that SINR is also referred to as signal-to-interference ratio (SIR).

In estimating CPICH symbol SINR, an impairment correlation matrix may be estimated, and the symbol SINR can be determined by the net response h, RAKE receiver combining weight w, and the impairment correlation matrix R, through $$SINR = \frac{w^H h h^H w}{w^H R w}, \tag{1}$$

which simplifies to $$SINR = h^H R^{-1} h, \tag{2}$$

when Generalized RAKE (G-RAKE) combining weights are used, $w = R^{-1} h$. Alternatively, one may estimate only the diagonal elements of impairment correlation, and for this class of receivers, $$SINR = \sum_i \frac{|h(i)|^2}{r(i, i)}, \tag{3}$$

where h(i) is the ith element of h, and $r_{i,i}$ is the ith diagonal element of R. Receivers of this class are referred to as RAKE+ herein, denoting their positioning on the sophistication scale as somewhere between the G-RAKE and standard RAKE architectures. RAKE+ can be viewed as an approximate form of G-RAKE.

If a RAKE receiver is used, only the average impairment power is needed, and $$SINR = \frac{h^H h}{\sigma_f^2}, \qquad (4)$$

where $\sigma_f^2$ corresponds to the average impairment power, possibly averaged across fingers.

After obtaining a CQI estimate, the mobile station then sends the CQI estimate to a supporting network base station (BS) through uplink signaling. The BS may further adjust the reported CQI based on the instantaneously available power of the HS-PDSCH to obtain an adjusted HS-PDSCH symbol SINR. The BS chooses a transmission data rate appropriate for the adjusted HS-PDSCH symbol SINR and the forward link data rate for the mobile station is set to the selected data rate.

Table 1 illustrates exemplary transport channel configurations for HSDPA and their respective SINR requirements for achieving 10% packet error rate (PER) at the mobile station.

TABLE 1

Examples of transport channel configuration for HS-PDSCH

| CQI value | Modulation | Coding rate | Data rate | Required SINR for 10% PER |
|---|---|---|---|---|
| 14 | QPSK | 0.67 | 1.29 Mbps | 9.5 dB |
| 15 | QPSK | 0.69 | 1.66 Mbps | 10.5 dB |
| 16 | 16QAM | 0.37 | 1.78 Mbps | 11.5 dB |
| 17 | 16QAM | 0.44 | 2.09 Mbps | 12.5 dB |
| 18 | 16QAM | 0.49 | 2.33 Mbps | 13.5 dB |

The required SINR given in Table 1 is based on a Gaussian assumption for all impairment (interference plus noise) at the mobile station receiver. Gaussian impairment can strongly degrade demodulation performance and thus is considered non-benign impairment. As mandated by the applicable WCDMA standards, the mobile station should determine its current SINR and then report the highest Channel Quality Indicator (CQI) value among all transport channel configurations having a PER lower than 10%.

For example, if measured channel quality is 13 dB, the mobile station should report CQI as 17, as that is the highest CQI value among all the configurations having PER lower than 10% at 13 dB SINR. In practice, only the CQI-value column and the SINR column of Table 1 are stored in the mobile station. Such a table is often referred to as the "MCS Switch Table."

For each transport channel configuration, the PER drops off rapidly. Within 1 dB, PER can go from 100% to less than 1%. This implies that the accuracy of CQI estimation is essential for proper link adaptation. If the mobile station over-estimates CQI by more than 1 dB, the throughput degrades dramatically, due to a very high block error rate. On the other hand if the mobile station under-estimates CQI, it does not operate at the highest possible data rate that the channel conditions permit, leading to under-utilization of the channel. CQI estimation thus plays a vital role in the design of high-speed data terminals.

It is common practice to estimate SINR from a received reference channel signal, such as a pilot signal or training sequence that is received in conjunction with a received signal of interest, e.g., a traffic channel or control channel signal. For example, SINR computations typically are based on received pilot symbols. In that context, let y(k) be a vector collecting despread values of the CPICH signal samples from all RAKE fingers during the kth symbol period. If the noise is simply additive, the ith element of y(k), $y_k(i)$, can be expressed as $$y_k(i)=s(k)h_k(i)+n_k(i) \qquad (5)$$

where s(k) is the modulation symbol value, $h_k(i)$ is the net response for the ith finger delay position, and $n_k(i)$ is the additive impairment component in $y_k(i)$. Note that the additive impairment component accounts for own-cell interference, other-cell interference, thermal noise, and also degradation due to typical receiver impairments such as DC offset, and non-ideal filtering, etc., and is generally modeled as Gaussian.

One may assume that the symbol value has unitary average power ($E[|s(k)|^2]=1$), and the impairment samples are i. i. d. and each has zero mean ($E[n_k(i)]=0, E[n_k(i)n^*_{k+1}(i)]=0$). During conventional SINR estimation, impairment correlation is estimated as $$\hat{R}=E[(y(k)s^*(k)-\hat{h}(k))(y(k)s^*(k)-\hat{h}(k))^H], \qquad (6)$$

where $\hat{h}(k)$ is the estimate of net response for the kth symbol period, and the ith component of $\hat{h}(k)$, $\hat{h}_k(i)$, is the estimate of $h_k(i)$. For RAKE+ and possibly for RAKE, only the diagonal elements of R are estimated. G-RAKE, RAKE+ and RAKE receiver architectures all implement some form of Eq. (6) in SINR estimation.

If the noise is ergodic, the expectation in Eq. (6) can be obtained by averaging over time. When $\hat{h}_k(i) \approx h_k(i)$, $\forall i, \hat{R} \approx R$, where $R=E[n(k)n(k)^H]$ and n(k) is a vector collecting the impairment components on all the RAKE fingers.

As noted, common practice is to use the CPICH symbols for generating CQI estimates for a received traffic channel signal. Thus, $y_k(i)$, $\hat{h}(k)$, and $\hat{R}$ are obtained based on CPICH despread values and the SINR of CPICH channel can be translated to that for HS-PDSCH (or another received channel of interest), by adjusting for differences in power and spreading factor.

The above approach to signal quality estimation generally works well enough where the predominant component of received signal impairment is Gaussian. However, the accuracy of such an approach degrades significantly where non-Gaussian impairment comprises an appreciable component of the overall impairment. Non-Gaussian impairments include impairments that are not well modeled by the Gaussian approximation. Such non-Gaussian impairment may result from multiplicative impairments that arise from phase noise, residual frequency error, and/or fast time-varying fading. Such impairments not only result in an increase in the power of the additive (Gaussian) impairment term $n_k(i)$, but also introduce an extra multiplicative term in the signal model, which is expressed as $$y_k(i)=s(k)h(i)m_k(i)+n_k(i)$$

where the additional multiplicative term $m_k(i)$ is used to account for the multiplicative effect due to phase noise and residual frequency error, for example.

Note that in the CDMA downlink, the increase in the power of $n_k(i)$ due to phase noise and/or frequency error is a result of loss of orthogonality. In that context, most of the degradation due to phase noise and residual frequency error is captured in the increase of the power of the additive impairment term $n_k(i)$. The multiplicative term $m_k(i)$ in practice does not result in significant degradation in demodulation. That is, the multiplicative impairment term is not as harmful to signal demodulation as compared to the additive impairment term.

It may be shown that without operation of the present invention, the presence of the multiplicative term $m_k(i)$ in the received signal model gives rise to severely under-estimating the CQI. Under-estimating the CQI results in lower achievable user throughput when link adaptation is employed.

The problem may be illustrated by assuming the net (channel) response is constant during the symbol intervals of interest—the subscript of h is omitted for simplicity. Without consideration of the multiplicative impairment term, the power of the additive impairment component of RAKE finger i (i.e. the (i, i) element of $\hat{R}$) can be estimated by $$\hat{r}(i,i) = E[|y_k(i)s^*(k) - \hat{h}(i)|^2]. \tag{7}$$

It can be shown that in the presence of multiplicative impairments, the estimate of Eq. (7) gives $\hat{r}(i,i) = E[|n_k(i)|^2] + E[|v_k(i)|^2]$, where $v_k(i)$ is a new impairment signal, $v_k(i) = h(i)m_k(i) - \hat{h}(i)$. In downlink CDMA, $v_k(i)$ represents CPICH self-interference due to the multiplicative impairment. It can be seen that the instantaneous rotation due to the multiplicative term $m_k(i)$ causes the desired signal to rotate away from the estimated channel coefficient. This imperfect alignment results in $h(i)m_k(i) - \hat{h}(i)$ appearing as an additional impairment from the quadrature direction. Thus, in this context, $v_k(i)$ may be referred to as the quadrature phase interference (QPI) of CPICH. Note that $v_k(i)$ is non-Gaussian. In other words, the imperfect de-rotation of CPICH symbols based on channel estimation errors generates a non-Gaussian multiplicative interference component that, unless discounted in the SINR/CQI estimation process, results in underestimation of the true received signal quality.

Similarly, impairment correlation estimation according to Eq. (6) gives rise to off-diagonal elements of $\hat{R}$ in the presence of multiplicative impairment $m_k(i)$ as $$\hat{r}(i,j) = E[n_k(i)n^*_k(j)] + E[v^*_k(i)v^*_k(j)]. \tag{8}$$

Like $\hat{r}(i,i)$, the element $\hat{r}(i,j)$ has a component due to Gaussian impairment and another component due to non-Gaussian impairment. Thus, one may write the impairment correlation matrix $\hat{R}$ as $$\hat{R} = \hat{R}_g + \hat{R}_a, \tag{9}$$

where $\hat{R}_g$ is the impairment correlation estimate for the Gaussian impairment n(k) and $\hat{R}_a$ is the impairment correlation estimate for the non-Gaussian impairment v(k), where v(k) is a vector collecting $v_k(i)$ from all the fingers of a RAKE receiver providing despread values of the reference signal.

Against the above backdrop, the present invention suppresses benign interference from the calculation of received signal quality, such that the quality estimate is based primarily on the harmful interference rather than on the total, apparent impairment, which includes both the benign and harmful interference. That is, in general, the present invention suppresses the effects of benign impairment from the calculation of received signal quality, such that the received signal quality estimate, whether reported as SIR, CQI, etc., primarily depends on the effects of non-benign impairment and thus generally is higher than would be calculated if total impairment was considered (i.e., benign plus non-benign impairment). In the following description of exemplary embodiments of the invention, the terms "Gaussian" and "non-Gaussian" are used as non-limiting examples of non-benign and benign interference, respectively.

Figure 1:
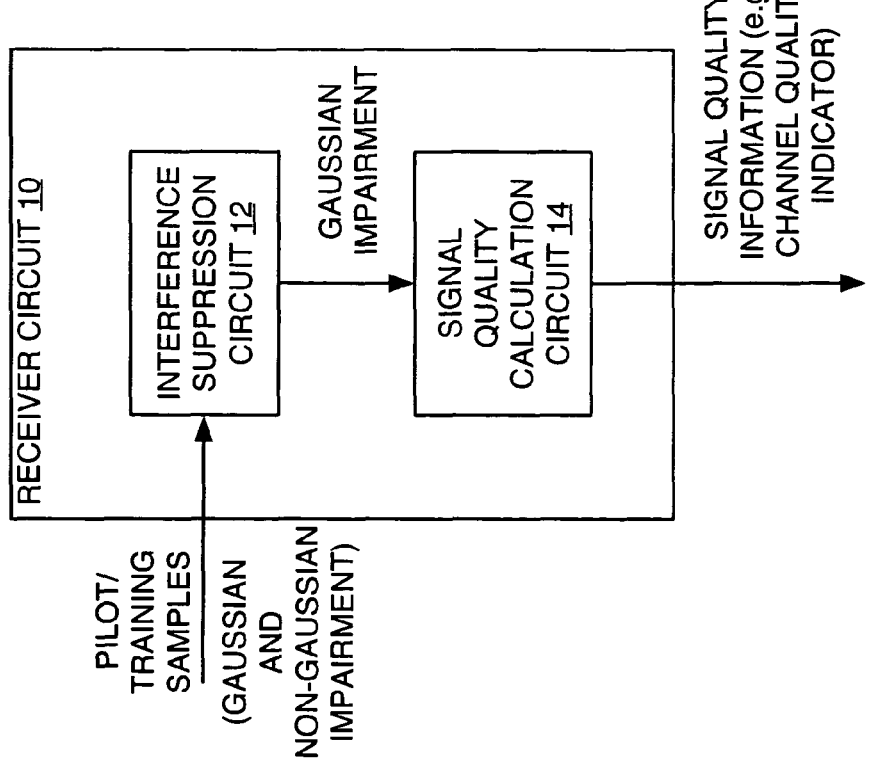
FIG. 1 is a diagram of an exemplary receiver circuit according to one or more embodiments of the present invention.

FIG. 1 introduces an exemplary receiver circuit 10, which is configured to provide improved signal quality estimation in the context of the present invention. While not illustrated as such for reasons of clarity, those skilled in the art will appreciate that receiver circuit 10 will operationally be associated with other receiver circuits, such as a receiver front-end, a RAKE receiver, etc. Such other structures are disclosed later herein.

In the illustrated embodiment, receiver circuit 10 comprises an interference suppression circuit 12 and a signal quality calculation circuit 14. As used herein, the terms "comprises," "comprising," "includes," and "including" should be construed as non-exclusive, open-ended terms of inclusion.

Broadly, receiver circuit 10 receives signal samples, such as reference signal samples, e.g., pilot/training despread values, from which it calculates an improved signal quality estimate based on suppressing the effects of benign (non-Gaussian) interference from that estimation. To that end, interference suppression circuit 12 operates on the signal samples used for received signal quality calculation to obtain an estimate of the Gaussian impairment component for the signal samples, and signal quality calculation circuit 14 computes a signal quality estimate therefrom, e.g., it computes a SINR value as a function of the estimated Gaussian impairment. Note that the SINR may be estimated for a traffic channel signal (or similar data signal) received in conjunction with the reference signal and, as noted earlier, the SINR estimate may be scaled or otherwise adjusted to account for differences in transmit power and/or CDMA spreading factor between the reference signal and the received signal of interest for which the SINR estimate is being generated.

FIG. 2 illustrates the basic operation of receiver circuit 10, wherein processing begins with the suppression of benign interference from the SINR calculation (Step 100). With the received signal quality thus estimated as a function of the harmful interference, receiver circuit 10 maps the improved SINR value into a channel quality indicator table, e.g., a CQI look-up table, which may be stored in the associated receiver circuit (Step 102). The associated receiver then reports the CQI value as indexed by the improved SINR estimate, and that CQI value is reported to a supporting network for link adaptation (Step 104).

Figure 3:
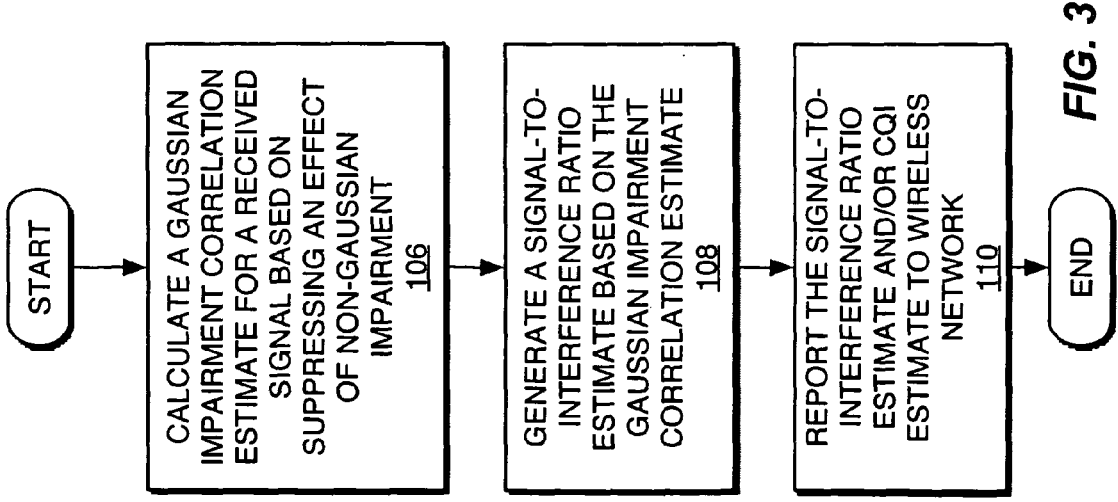
FIG. 3 is a more detailed diagram of exemplary signal quality estimation.

FIG. 3 provides exemplary details for this general process, wherein receiver circuit 10 calculates a Gaussian impairment correlation estimate for the received signal based on suppressing an effect of non-Gaussian impairment from that calculation (Step 106). A signal-to-interference ratio estimate, e.g., a SINR value, is generated from the Gaussian impairment correlation estimate (Step 108), which means that the estimate of signal quality discounts the effects of any non-Gaussian impairment which may be present at the receiver. The signal-to-interference ratio estimate and/or a corresponding CQI value thus is reported to the supporting network (Step 110).

Figure 4:
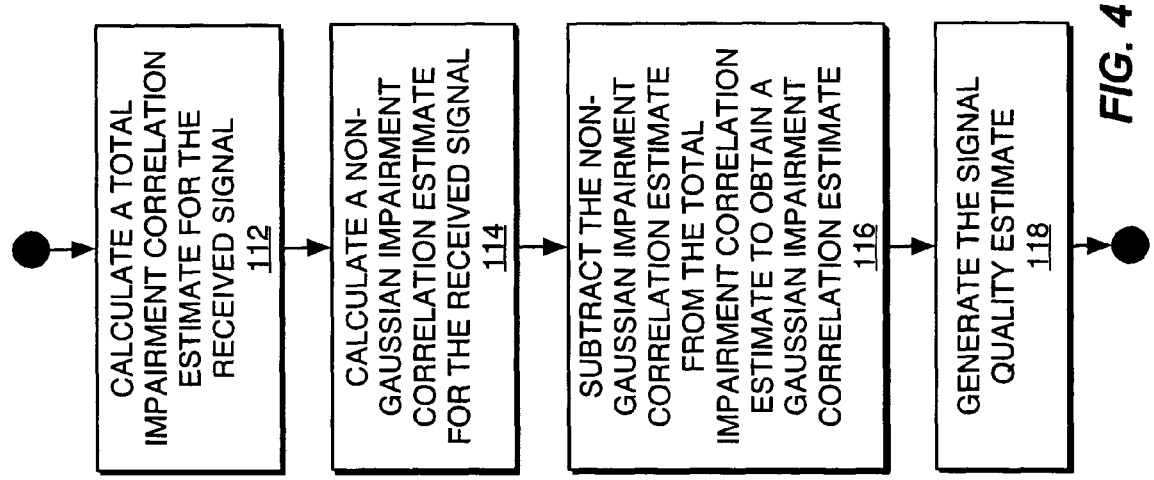
Figure 6:
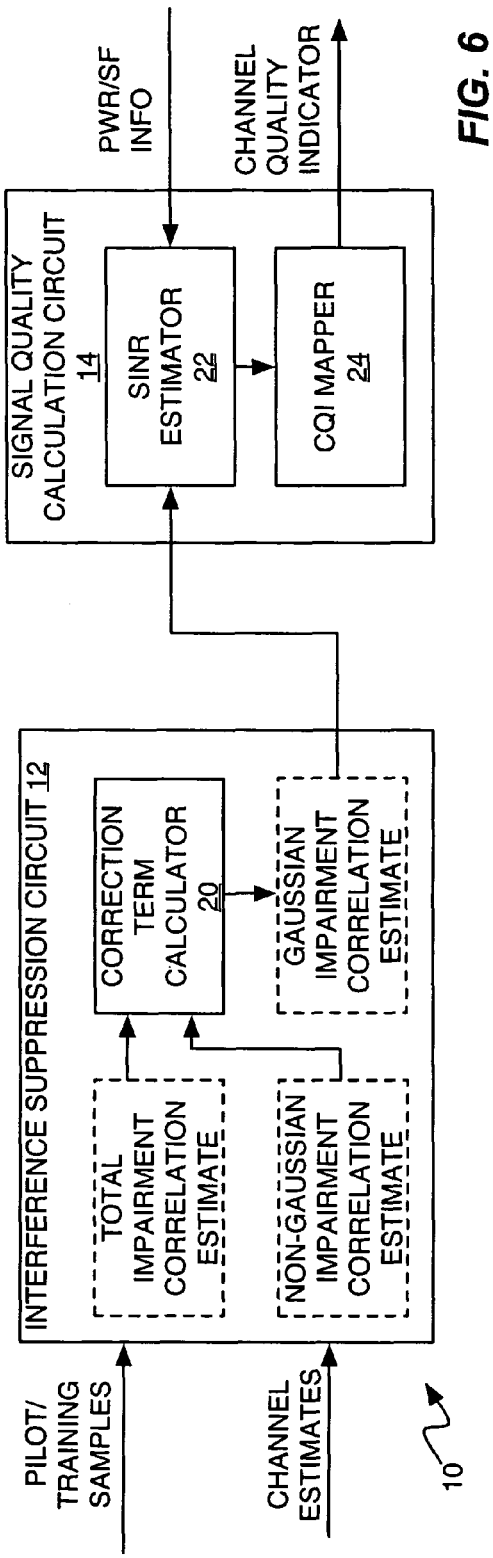
FIGS. 6 and 7 are diagrams of exemplary functional implementations for the receiver circuit of FIG. 1 in accordance with the processing logic of FIGS. 4 and 5, respectively.

Suppression of non-Gaussian impairment from the signal quality estimation may be accomplished in a number of ways. In one exemplary embodiment, which is illustrated in FIG. 4, receiver circuit 10 makes an overall impairment estimate and then removes an estimated non-Gaussian component from that overall estimate to arrive at the estimated Gaussian impairment for use in signal quality estimation. FIG. 6 illustrates an exemplary functional configuration of receiver circuit 10 in this context, wherein the interference suppression circuit 12 generates the total impairment correlation estimate, the non-Gaussian impairment correlation estimate, and the Gaussian impairment correlation estimate. Suppression circuit 12 may include a correction term calculator 20 to "scale" or otherwise compensate the Gaussian impairment component to enhance its accuracy, and such operation is described in more detail later herein.

Complementing the illustrated suppression circuit 12, the signal quality calculation circuit 14 comprises a SINR estimator 22, and a CQI mapper 24. The signal quality calculation circuit 14 is, in an exemplary embodiment, configured to calculate a SINR estimate based on the Gaussian impairment correlation estimate from the suppression circuit 12. In turn, the CQI mapper circuit 24, which may comprise a look-up circuit that accesses a memory-stored CQI table, or which may comprise a logic circuit to calculate a functional CQI value from the SINR estimate, generates a CQI value from the SINR estimate. The CQI value may be reported to the supporting communication network for purposes of ongoing link adaptation.

Turning back to the exemplary logic of FIG. 4, processing thus begins with the calculation of a total impairment correlation estimate for the received signal (Step 112), which again may be based on pilot/training signal samples received. Receiver circuit 10 then calculates a non-Gaussian impairment correlation estimate for the received signal (Step 114), and then "removes" that non-Gaussian impairment correlation estimate from the total impairment correlation estimate to obtain the Gaussian impairment correlation estimate (Step 116). Receiver circuit 10 then generates a signal quality estimate from the Gaussian impairment correlation estimate (Step 118).

A straightforward approach to such processing is to estimate a total impairment correlation matrix, estimate a non-Gaussian impairment correlation matrix, and then subtract the latter matrix from the former to obtain a Gaussian impairment correlation matrix. In more detail, the total impairment correlation matrix, $\hat{R}$, and the correlation matrix contributed by the non-Gaussian impairment, $\hat{R}_a$, are first individually estimated. The correlation matrix contributed by the Gaussian impairment $\hat{R}_g$, is then obtained by taking the difference between the two estimated correlation matrices.

The diagonal terms of $\hat{R}_a$ can be estimated by averaging the product of the impairment components in successive symbol intervals such as $$\rho_k(i, i) = \left(y_k(i)s^*(k) - \hat{h}(i)\right)\left(y_{k+1}(i)s^*(k+1) - \hat{h}(i)\right)^*, \quad (10)$$

$$\text{where } \hat{r}_a(i, i) = \frac{1}{K}\sum_{k=0}^{K-1} \rho_k(i, i). \quad (11)$$

The off-diagonal terms of $\hat{R}_a$ can be estimated by averaging the product of the impairment components in successive symbol intervals such as $$\rho_k(i, j) = \left(y_k(i)s^*(k) - \hat{h}(i)\right)\left(y_{k+1}(j)s^*(k+1) - \hat{h}(j)\right)^*, \quad (12)$$

$$\text{where } \hat{r}_a(i, j) = \frac{1}{K}\sum_{k=0}^{K-1} \rho_k(i, j). \quad (13)$$

It may be shown that where the multiplicative noise changes slowly relative to the symbol duration, $\hat{r}_a(i,j) \approx r_a(i,j)$.

When the multiplicative noise changes more rapidly relative to the symbol duration, the power and correlation due to the non-Gaussian self-interference term generally cannot be completely accounted for, because $Re\{E[(h(i)m_k(i) - \hbar(i))(h(i)m_{k+1}(i) - \hbar(i))^*]\}$ is less than $E[|h(i)m_k(i) - \hbar(i)|^2]$.

Such circumstances arise, for example, where the interfering phase noise has a large effective bandwidth relative to the symbol rate of the reference signal on which the SINR estimation is based. As an example, the non-Gaussian impairment component may have a large bandwidth relative to the symbol rate of CPICH in WCDMA, which is about 15 kHz.

In such cases, the correction term calculator 20 may be configured to calculate a correction term F that can be used to scale up $\hat{R}_a$. This correction term can be determined based on the rate the multiplicative impairments change between symbol periods. That is, it can be configured to be larger as a function of more rapid changes and smaller as a function of less rapid changes. In this manner, the extent to which the non-Gaussian impairment correlation component is underestimated due to its greater bandwidth is reduced.

For example, the correction term F may be calculated as $$F = \frac{\frac{1}{K}\sum_{k=0}^{K-1} |m_k(i)|^2}{Re\left\{\frac{1}{K}\sum_{k=0}^{K-1} m_k(i)m_{k+1}^*(i)\right\}}, \quad (14)$$

which is the ratio between the auto-correlation of the multiplicative impairments and the temporal cross-correlation of the multiplicative impairments. In the design stage, the multiplicative impairments can be simulated according to the receiver characteristics, and F can be found during such simulations. For a residual frequency of 10-50 Hz and for a 4 kHz loop bandwidth of the phase noise, an exemplary F is approximately 1.2. Receiver circuit 10 may be configured to use one or more predetermined values for F, or may be configured to calculate a correction term. The correction term F can also be used to include a fraction of $R_a$ in $R_g$. For example, F=0.2 can be used when the non-Gaussian interference is not entirely benign.

The total impairment correlation matrix can be estimated by methods according to Eq. (6), for example. Thus, with $\hat{R}$ and $\hat{R}_a$, the impairment correlation matrix contributed by the Gaussian component is $$\hat{R}_g = \hat{R} - F\hat{R}_a. \quad (15)$$

The symbol SINR then may be computed for the G-RAKE receiver based just on the contribution of the Gaussian impairment component as $$SINR = h^H \hat{R}_g^{-1} h. \quad (16)$$

For the RAKE+ receiver, the appropriate calculation is $$SINR = \sum_i \frac{|h(i)|^2}{\hat{r}_g(i, i)}, \quad (17)$$

where $\hat{r}_g(i,i)$ is the ith diagonal element of $\hat{R}_g$. Finally, if a RAKE receiver is used, the calculation is given as $$SINR = \frac{h^H h}{\sigma_I^2}, \tag{18}$$

where $\sigma_I^2$ can be computed as a function of the Gaussian impairment component by $$\sigma_I^2 = \frac{1}{J}\sum_{i=0}^{J-1} \hat{r}_g(i,i).$$

With any of the above SINR computations, a corresponding CQI may be generated based on indexing a SINR-to-CQI lookup table, or based on making a SINR-to-CQI calculation.

Figure 5:
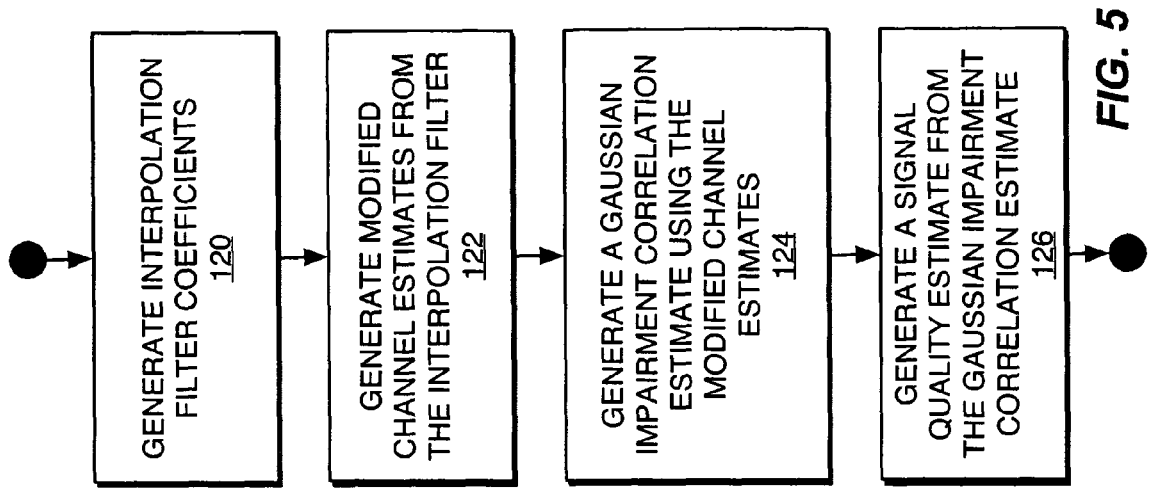
FIGS. 4 and 5 are diagrams of alternative embodiments of the benign interference suppression called out in the exemplary processing of FIG. 3.

Turning to another exemplary method of suppressing or otherwise discounting the effects of benign, non-Gaussian impairment from the calculation of received signal quality, FIG. 5 illustrates an embodiment wherein such impairment is suppressed in a channel estimation process. By suppressing the non-Gaussian impairment component from the channel estimation process, the estimation of impairment correlation, which is based on those channel estimates, depends primarily on the Gaussian impairment component.

Broadly, the method comprises suppressing the non-Gaussian impairment from the calculation of the signal-to-interference ratio estimate by filtering during the channel estimation process to obtain modified channel estimates for the received signal that are compensated for the multiplicative impairment. The modified channel estimates are tuned to track the fast variations of the multiplicative impairment and, in general, are different from the channel estimates obtained for demodulation. In turn, the Gaussian impairment correlation estimate is calculated from the modified channel estimates, and a corresponding signal-to-interference ratio estimate is calculated based on the Gaussian impairment correlation estimate.

Filtering during the channel estimation process to obtain modified channel estimates for the received signal may comprise calculating filter coefficients for an interpolation filter, and calculating the modified channel estimates based on applying the interpolation filter to despread values of a pilot signal received in conjunction with the received signal. Further, the method may comprise configuring the interpolation filter to have a filter bandwidth that is high enough to track the multiplicative impairment but less than a noise power bandwidth of the despread values.

According to FIG. 5, then, exemplary processing begins with the generation of interpolation filter coefficients (Step 120). Alternatively, these interpolation filter coefficients can be pre-computed and stored in a memory. The filter coefficients are then used in conjunction with received reference signal samples (e.g., despread pilot values) to obtain modified channel estimates so that the non-Gaussian impairment is suppressed when estimating impairment correlation (Step 122). A Gaussian impairment correlation component is estimated from the modified channel response estimates (Step 124) and, as before, a signal quality estimate is generated from the estimate of Gaussian impairment correlation (Step 126).

Figure 7:
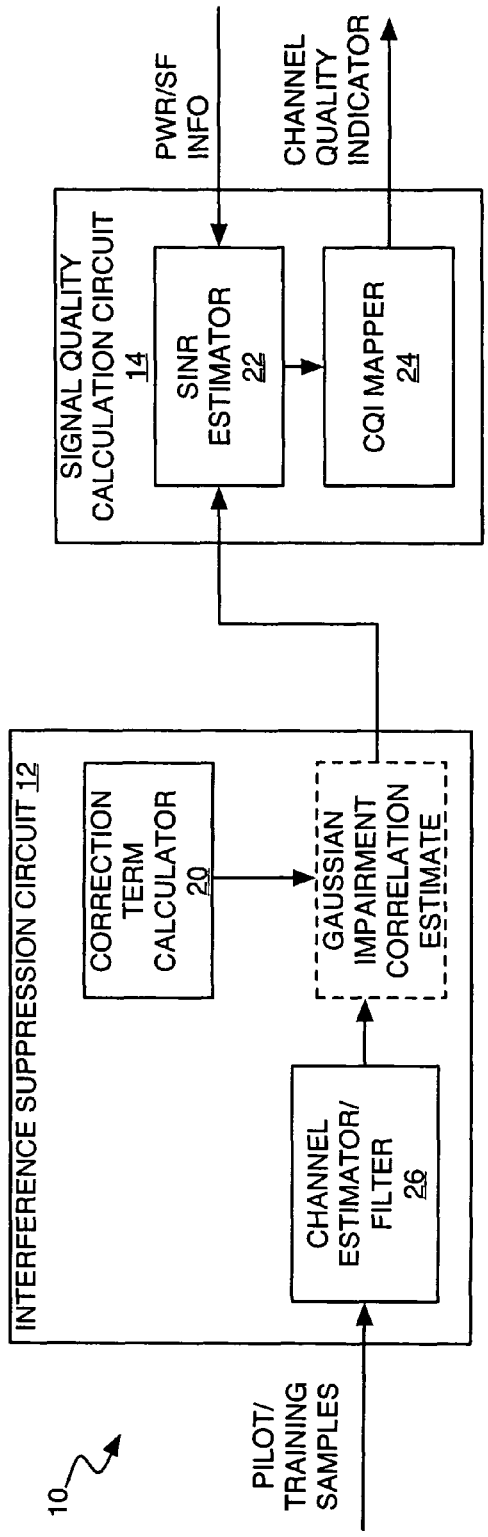

FIG. 7 illustrates an exemplary functional embodiment of receiver circuit 10 in this filter-based suppression context, wherein the suppression circuit 12 comprises a channel estimator/filter 26 and the previously discussed correction term calculator 20, although the correction term calculator 20 may not be used in the filter-based embodiment where tracking of multiplicative impairment may be satisfactorily accurate over its full bandwidth.

Thus, with the filter-based method of obtaining modified channel estimates, the multiplicative impairment term is folded into the calculation of channel net response during the channel coefficient estimation process. With this approach, there is little or no misalignment between the instantaneous CPICH despread values and the modified net channel responses, which prevents the QPI giving rise to the multiplicative impairment term. For satisfactory performance, the channel coefficient estimation process should be fast enough to keep up with the changes in the multiplicative impairment term, which often has a bandwidth in the order of 1 kHz due to the effective bandwidth of phase noise.

In more detail, the filter-based approach considers the multiplicative impairment as part of the modified channel-net response, $h'_k(i)=h(i)m_k(i)$, and as a result, each despread value is given by $$y_k(i)=s(k)h'_k(i)+n_k(i) \tag{19}$$

Since the multiplicative impairment may be fast changing, $h'_k(i)$ may vary from symbol to symbol.

Let H be a matrix with the (i,k)th element equal to $h'_k(i)$. An estimate of H can be obtained by performing an interpolation over the despread values $y_k(i)$ using an interpolation filter configured to have a bandwidth on the same order as the bandwidth of the multiplicative impairment term. In this way, the variation of the multiplicative impairment term $m_k(i)$ can be better tracked. Alternatively, the multiplicative impairment term $m_k(i)$ can be tracked using a phase-lock loop, and it should be understood that such variations are contemplated by, and within the scope of, the present invention.

Continuing with the filter-based embodiment, let A be the matrix representing the interpolation filter. The (i,j)th element of A is given by $$\alpha_{i,j} = \text{sinc}\left(\frac{(i-j)f_w}{f_s}\right), \tag{20}$$

where $f_w$ is the bandwidth of the interpolation filter and $f_s$ is the sampling rate for obtaining $y_k(i)$. The sinc function is defined as sinc $(x)=\sin(x)/x$. If the CPICH in WCDMA is used, then $f_s=15$ kHz. Those skilled in the art will appreciate that such particulars likely will change for other systems of interest, e.g., cdma2000, etc.

Regardless, the estimate of H is then $$\hat{H}=AY, \tag{21}$$

where the (i, k)th element of matrix Y is $y_k(i)$.

With interpolation, estimation noise can be reduced without sacrificing the ability to track fast changes in multiplicative impairment term, as long as the bandwidth of the interpolation filter is sufficient.

In this case, the realization of additive Gaussian impairment can be obtained by $$\hat{n}'_k(i)=y_k(i)-\hat{h}'_k(i). \tag{22}$$

Impairment correlation due to $\hat{n}'_k(i)$ can be estimated $$\hat{R}'_g = \frac{1}{K-1} \sum_{k=0}^{K-1} \hat{n}'_k (\hat{n}'_k)^*, \quad (23)$$

where $\hat{n}'_k$ is a vector collecting all elements of $\hat{n}'_k(i)$ across all RAKE fingers. However, it should be noted that in the interpolation process, variations in the despread values due to low frequency components of the additive Gaussian impairment is removed, and thus $\hat{n}'_k(i)$ has only high frequency components. As a result, $\hat{R}'_g$ can be adjusted to $\hat{R}_g$ by $$\hat{R}_g = \hat{R}'_g f_w/(f_s - f_w). \quad (24)$$

Figure 8:
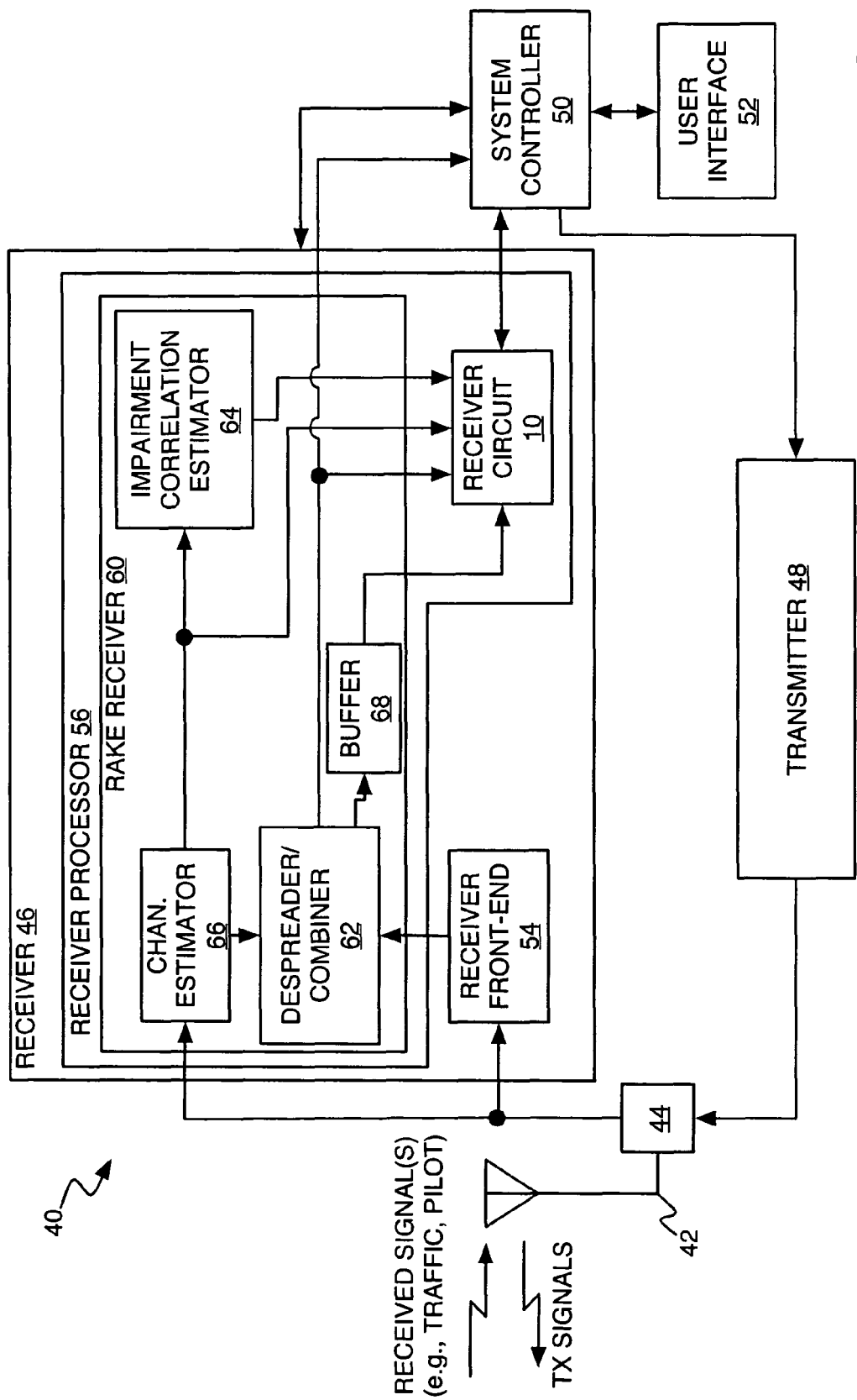
FIG. 8 is a diagram of an exemplary mobile station according to the present invention, for use in a supporting wireless communication network.

From the above exemplary details, it will be appreciated that the present invention applies to a range of receiver implementations. However, FIG. 8 illustrates an exemplary application of receiver circuit 10 wherein a mobile station 40 includes an embodiment of receiver circuit 10, such that it generates (and reports) improved signal quality estimates to a supporting wireless communication network. As used herein, the term "mobile station" should be given broad construction. Thus, mobile station 40 may be a cellular radiotelephone, a Portable Digital Assistant (PDA), a palmtop/laptop computer, a wireless pager, or other type of portable communication device.

In the illustrated embodiment, mobile station 40 comprises a transmit/receive antenna assembly 42, a switch/duplexer 44, a receiver 46, a transmitter 48, a system controller 50, and a user interface 52, which may include a keypad, a display screen, a speaker, and a microphone. System controller 50 generally provides overall system control and may comprise a microprocessor/microcontroller circuit that may or may not be integrated with other processing logic within the mobile station 40.

An exemplary receiver 46 comprises a receiver front-end circuit 54, which may comprise one or more filtering and amplification stages, and which generally includes one or more analog-to-digital conversion circuits to provide the incoming received signal(s) as sampled data to a receiver processor 56. As such, receiver processor 56 may receive signal samples corresponding to a combination of received signals, such as traffic, control, and pilot signals.

Receiver processor circuit 56 may comprise all or a portion of a baseband digital signal processor implemented in hardware, software, or any combination thereof. Regardless, an exemplary receiver processor circuit 56 comprises, in addition to receiver circuit 10, a RAKE receiver circuit 60 that includes a despreader/combiner circuit 62 and further includes (or is associated with) an impairment correlation estimator 64, a channel estimator 66, and a buffer (memory circuit) 68. Note that in one or more embodiments, the impairment correlation estimator 64 and/or channel estimator 66 may be implemented as part of RAKE receiver circuit 60, in which case receiver circuit 10 is configured to receive output from them. In other embodiments, receiver circuit 10 may be configured to include these elements, in which case the appropriate impairment and channel estimation information is provided to despreader/combiner 62 for RAKE despreading and combining operations. RAKE receiver circuit 60 may comprise a RAKE, a RAKE+, or a G-RAKE circuit as disclosed earlier herein.

Regardless, despreader/combiner 62 includes a plurality of correlators, which are also referred to as RAKE fingers herein, that provide despread values for selected received signal components. In an exemplary embodiment, RAKE processor circuit 60 provides despread pilot values to receiver circuit 10 for use in Gaussian impairment correlation estimation and correspondingly improved estimation of received signal quality. Note that receiver circuit 10 may use buffered despread values stored in buffer 68 for signal quality estimation processing.

For example, the baseband received signal output by receiver front-end circuit 54 is despread by RAKE receiver circuit 60 according to a reference channel (e.g., CPICH) to produce despread values. These despread values are collected over a predetermined duration (e.g., a WCDMA transport time interval) and saved in buffer 68. The buffered despread values may be processed to produce channel coefficient estimates. The despread values and channel coefficient estimates may be passed to receiver circuit 10 to calculate impairment realizations and a corresponding Gaussian impairment correlation estimate. Receiver circuit 10 then uses the Gaussian impairment correlation estimate to generate a signal quality estimate, e.g., a SINR value. That SINR value is then mapped to a CQI value, which is provided to system controller 50 for reporting back to the supporting network via transmission of control signaling by transmitter 48.

Thus configured, mobile station 40 implements an exemplary channel quality estimation method based on receiving incoming signals from a supporting wireless communication network. Exemplary received signals include a traffic or control channel for which the network should receive periodic signal/channel quality reports from the mobile station 40, and a reference signal, e.g., a pilot signal for use by the mobile station in calculating received signal quality. Mobile station 40 may be configured as a WCDMA terminal, or may be configured in accordance with one or more other wireless standards as needed or desired.

Indeed, although the foregoing discussion presented exemplary details in the context of WCDMA, the present invention is not limited to such applications. Broadly, the present invention provides improved signal quality estimation by suppressing or otherwise reducing the effect of benign, non-Gaussian impairment from the calculation of received signal quality. As such, the present invention is not limited by the foregoing discussion but rather is limited only by the following claims and their reasonable equivalents.

What is claimed is:

1. A method of estimating signal quality comprising:
    calculating a signal-to-interference ratio estimate for a received signal subject to a total impairment comprising a first type of impairment that is relatively harmful with respect to demodulation of the received signal and a second type of impairment that is relatively benign with respect to demodulation of the received signal; and
    suppressing effects of the second type of impairment from the calculation of the signal-to-interference ratio estimate such that the signal-to-interference ratio estimate depends primarily on the first type of impairment by subtracting a correlation estimate for the second type of impairment from a correlation estimate for the total impairment to obtain a correlation estimate for the first type of impairment, and calculating the signal-to-interference ratio estimate based on the correlation estimate for the first type of impairment.

2. The method of claim 1, wherein the first type of impairment comprises Gaussian-type interference, and wherein the second type of impairment comprises non-Gaussian type interference.

3. The method of claim 1 further comprising:
reporting signal quality to a wireless communication network as a function of the signal-to-interference ratio estimate.

4. A method of estimating signal quality from a received signal subject to a total impairment comprising both a first impairment that is relatively harmful with respect to demodulation of the received signal and a second impairment that is relatively benign with respect to demodulation of the received signal, the method comprising:
calculating channel estimates based on the received signal;
reducing the presence of the second impairment in impairment correlation estimates generated from the channel estimates;
calculating a signal-to-interference ratio estimate for the received signal based on the impairment correlation estimates to reduce the presence of the second impairment in the signal-to-interference estimate.

5. The method of claim 4, further comprising mapping the signal-to-interference ratio estimate to a channel quality indicator, and reporting the channel quality indicator to a supporting wireless communication network.

6. The method of claim 5, wherein the received signal comprises at least a reference channel signal, and wherein reporting the channel quality indicator to a supporting wireless communication network comprises reporting the channel quality indicator to the supporting wireless communication network for data rate adaptation of a CDMA packet data channel signal.

7. The method of claim 6, wherein calculating the signal-to-interference ratio estimate comprises calculating the signal-to-interference ratio estimate for the reference channel signal based on the impairment correlation estimates.

8. The method of claim 7, further comprising adjusting the signal-to-interference ratio estimate for differences in power and spreading factor between the CDMA packet data channel signal and the reference channel signal.

9. The method of claim 4, wherein calculating the signal-to-interference ratio estimate for the received signal comprises calculating a signal-to-interference-plus-noise ratio estimate for the received signal.

10. The method of claim 4, wherein reducing the presence of the second impairment in the impairment correlation estimates comprises calculating a total impairment correlation estimate, and obtaining a correlation estimate for the first impairment by subtracting a correlation estimate for the second impairment from the total impairment correlation estimate, and wherein calculating the signal-to-interference ratio for the received signal based on the impairment correlation estimates comprises calculating the signal-to-interference ratio estimate based on the correlation estimate for the first impairment.

11. The method of claim 10, further comprising calculating a correction term as a function of a rate of change of a multiplicative impairment, and scaling the correlation estimate for the second impairment by the correction term.

12. The method of claim 10, wherein the first impairment comprises Gaussian impairment and the second impairment comprises non-Gaussian impairment, and wherein obtaining a correlation estimate for the first impairment by subtracting a correlation estimate for the second impairment from the total impairment correlation estimate comprises subtracting a non-Gaussian impairment correlation estimate from the total impairment correlation estimate to obtain a Gaussian impairment correlation estimate, and wherein calculating the signal-to-interference ratio for the received signal based on the impairment correlation estimates comprises calculating the signal-to-interference ratio estimate based on the Gaussian impairment correlation estimate.

13. The method of claim 4, wherein reducing the presence of the second impairment in the impairment correlation estimates comprises filtering effects of the second impairment in a channel estimation process to obtain modified channel estimates, and calculating a correlation estimate for the first impairment based on the modified channel estimates, and wherein calculating the signal-to-interference ratio for the received signal based on the impairment correlation estimates comprises calculating the signal-to-interference ratio estimate based on the correlation estimate for the first impairment.

14. The method of claim 13, and wherein filtering effects of the second impairment comprises filtering the calculated channel estimates to suppress the effects of the second impairment from the channel estimates.

15. The method of claim 13, wherein filtering effects of the second impairment comprises calculating filter coefficients for an interpolation filter, and applying the interpolation filter to despread values of a reference channel signal received as part of the received signal to obtain the modified channel estimates.

16. The method of claim 15, further comprising configuring the interpolation filter to have a filter bandwidth large enough to track a multiplicative impairment term corresponding to the second impairment.

17. The method of claim 4, wherein the first impairment comprises Gaussian interference and the second impairment comprises non-Gaussian interference, and wherein reducing the presence of the second impairment in the impairment correlation estimates comprises reducing the presence of the non-Gaussian interference in the impairment correlation estimates.

18. The method of claim 17, wherein reducing the presence of the non-Gaussian interference in the impairment correlation estimates comprises filtering the non-Gaussian interference in a channel estimation process to obtain modified channel estimates used to calculate the impairment correlation estimates.

19. The method of claim 17, wherein reducing the presence of the non-Gaussian interference in the impairment correlation estimates comprises calculating a total impairment correlation estimate for the Gaussian and non-Gaussian interference, calculating a non-Gaussian impairment correlation estimate for the non-Gaussian interference, and subtracting the non-Gaussian impairment correlation estimate from the total impairment correlation estimate to obtain a Gaussian impairment correlation estimate for the Gaussian interference, and wherein calculating the signal-to-interference ratio estimate for the received signal comprises calculating the signal-to-interference ratio estimate based on the Gaussian impairment correlation estimate.

20. A receiver circuit for estimating signal quality from a received signal subject to a total impairment comprising both a first impairment and a second impairment, wherein the first impairment is relatively harmful with respect to demodulation of the received signal and the second impairment is relatively benign with respect to demodulation of the received signal, said receiver circuit comprising:
an impairment suppression circuit configured to:
calculate a total impairment correlation estimate; and
obtain a correlation estimate for the first impairment by subtracting a correlation estimate for the second impairment from the total impairment correlation estimate;

a signal quality calculation circuit configured to calculate a signal-to-interference ratio estimate for the received signal based on the correlation estimate for the first impairment so that the signal-to-interference ratio estimate depends primarily on the first impairment.

21. The receiver circuit of claim 20, wherein the calculation circuit is configured to map the signal-to-interference ratio estimate to a channel quality indicator for reporting to a supporting wireless communication network.

22. The receiver circuit of claim 21, wherein the received signal comprises at least a reference channel signal, and wherein reporting the channel quality indicator to a supporting wireless communication network comprises reporting the channel quality indicator to the supporting wireless communication network for data rate adaptation of a CDMA packet data channel signal.

23. The receiver circuit of claim 22, wherein the calculation circuit is configured to calculate the signal-to-interference ratio estimate for the received signal based on calculating the signal-to-interference ratio estimate from the reference channel signal.

24. The receiver circuit of claim 23, wherein the calculation circuit is configured to adjust the signal-to-interference ratio estimate for differences in power and spreading factor between the CDMA packet data channel signal and the reference channel signal.

25. The receiver circuit of claim 20, wherein the calculation circuit is configured to calculate the signal-to-interference ratio estimate as a signal-to-interference-plus-noise ratio for the received signal.

26. The receiver circuit of claim 20, wherein the impairment suppression circuit includes a correction term calculation circuit configured to calculate a correction term as a function of a multiplicative impairment term arising from the second impairment, and wherein the impairment suppression circuit is configured to scale the correlation estimate for the second impairment by the correction term.

27. The receiver circuit of claim 20 wherein the receiver circuit is disposed in a mobile terminal for use in a wireless communication network.

28. A receiver circuit for estimating received signal quality for a received signal subject to a total impairment comprising both a first impairment that is relatively harmful with respect to demodulation of the received signal and a second impairment that is relatively benign with respect to demodulation of the received signal, the receiver circuit comprising:
    an impairment suppression circuit configured to reduce the presence of the second impairment in impairment correlation estimates generated from channel estimates calculated based on the received signal; and
    a signal quality calculation circuit configured to calculate a signal-to-interference ratio estimate for the received signal based on the impairment correlation estimates to reduce the presence of the second impairment in the signal-to-interference estimate.

29. The receiver circuit of claim 28, wherein the signal quality calculation circuit is configured to map the signal-to-interference ratio estimate to a channel quality indicator for reporting to a supporting wireless communication network.

30. The receiver circuit claim 29, wherein the received signal comprises at least a reference channel signal.

31. The receiver circuit of claim 30, wherein the signal quality calculation circuit is configured to calculate the signal-to-interference ratio estimate for the received signal based on calculating the signal-to-interference ratio estimate for the reference channel signal, and wherein the signal quality calculation circuit is further configured to adjust the signal-to-interference ratio estimate for differences in power and spreading factor between the reference channel signal and the CDMA packet data channel signal.

32. The receiver circuit of claim 28, wherein the first impairment comprises a Gaussian impairment and the second impairment is comprises a non-Gaussian impairment, and wherein the impairment suppression circuit is configured to reduce the presence of the non-Gaussian impairment in the impairment correlation estimates by calculating a total impairment correlation estimate based on the received signal, and obtaining a Gaussian impairment correlation estimate by subtracting a non-Gaussian impairment correlation estimate from the total impairment correlation estimate.

33. The receiver circuit of claim 32, wherein the impairment suppression circuit includes a correction term calculation circuit that is configured to calculate a correction term as a function of a multiplicative impairment term arising from the second impairment, and further configured to scale the correlation estimate for the second impairment by the correction term.

34. The receiver circuit of claim 28, wherein the impairment suppression circuit includes a channel estimation with filter circuit, and wherein the impairment suppression circuit is configured to suppress the second impairment from the calculation of the signal-to-interference ratio estimate by using the channel estimation with filter circuit to filter effects of the second impairment in a channel estimation process and thereby obtain modified channel estimates for the received signal, and to calculate a first impairment correlation estimate based on the modified channel estimates.

35. The receiver circuit of claim 34, wherein the channel estimation with filter circuit comprises an interpolation filter and wherein the impairment suppression circuit is configured to calculate filter coefficients for the interpolation filter, and to calculate the modified channel estimates based on applying the interpolation filter to despread values of a reference channel signal that is part of the received signal, or that is received in conjunction with the received signal.

36. The receiver circuit of claim 28 wherein the receiver circuit is disposed in a mobile terminal for use in a wireless communication network.

* * * * *

UNITED STATES PATENT AND TRADEMARK OFFICE
CERTIFICATE OF CORRECTION

PATENT NO. : 7,773,950 B2
APPLICATION NO. : 10/869527
DATED : August 10, 2010
INVENTOR(S) : Wang et al.

It is certified that error appears in the above-identified patent and that said Letters Patent is hereby corrected as shown below:

On Page 2, in Field (56), under "OTHER PUBLICATIONS", in Column 2, Line 29, delete "Bejing," and insert -- Beijing, --, therefor.

In Column 4, Line 66, delete "ri,I" and insert -- r(i,i) --, therefor.

In Column 6, Line 31, delete "R" and insert -- $\hat{R}$ --, therefor.

In Column 7, Line 14, delete " $h$ " and insert -- $\hat{h}$ --, therefor.

In Column 10, Line 16, delete " $\hat{R}_a$ " and insert -- $\hat{R}_a$ --, therefor.

In Column 12, Line 25, in Equation (19), after "nk(i)", insert -- . --.

In Column 12, Line 45, in Equation (20), delete "αi,j" and insert -- ai,j --, therefor.

In Column 12, Line 49, delete "fwis" and insert -- fw is --, therefor.

In Column 12, Line 49, delete "fsis" and insert -- fs is --, therefor.

In Column 16, Line 14, in Claim 14, after "13," delete "and".

In Column 18, Line 5, in Claim 30, delete "circuit claim" and insert -- circuit of claim --, therefor.

Signed and Sealed this
Twenty-ninth Day of March, 2011

David J. Kappos
*Director of the United States Patent and Trademark Office*